United States Patent [19]

Clabburn et al.

[11] 3,906,623

[45] Sept. 23, 1975

[54] METHOD OF MAKING AN ELECTRICAL CONNECTION

[75] Inventors: Robin James Thomas Clabburn, Highworth; Frederick William Leslie Hill, Lechlade, both of England

[73] Assignee: Raychem Corporation, Menlo Park, Calif.

[22] Filed: May 2, 1973

[21] Appl. No.: 356,397

[30] Foreign Application Priority Data

May 4, 1972 United Kingdom............... 20787/72

[52] U.S. Cl.................... 29/628; 174/87; 174/94 R; 85/77; 339/97 C; 339/276 R
[51] Int. Cl.² ........................................ H02G 15/08
[58] Field of Search............ 174/84 R, 84 C, 87, 90, 174/94 R; 339/276 S, 19, 97 C, 247; 85/77; 29/511, 523, 628, 630 F, 507

[56] References Cited
UNITED STATES PATENTS
3,673,314    6/1972    Zimmermann et al. .......... 174/92 X

*Primary Examiner*—Darrell L. Clay
*Attorney, Agent, or Firm*—Lyon and Lyon

[57] ABSTRACT

Method and apparatus is provided in which a deformable inner member is positioned inside a hollow outer member. The inner member receives a force which causes its outward deformation towards an inner surface of the outer member. An object such as one or more electrical conductors is placed between the inner and outer member to achieve a mechanical and/or electrical connection. If an electrical connection is desired, the inner and/or outer member is chosen to be electrically conductive, and the deformation of the inner member towards the outer member also displaces the insulation from the electrical conductors thereby exposing bared portions of the conductors and realizing an electrical connection.

1 Claim, 7 Drawing Figures

METHOD OF MAKING AN ELECTRICAL CONNECTION

BACKGROUND OF THE INVENTION

This invention relates to methods and apparatus for making electrical and/or mechanical connections.

More particularly, this invention relates to the expansion of an inner deformable member towards an inner surface of an outer member to realize a connection for an object placed between the inner and outer members.

Surprising results have been observed such as that by mechanically squeezing two or more insulated conductors or wires betweenn an inner deformable member and an outer member of appropriate dimensions by means of an expansion operation, that the insulation of the wires is stripped or displaced from the wires so that an electrical connection is made between them. The inner and/or outer member is also electrically conductive depending on the type of electrical connection desired. Because the outer member is not significantly deformed during this operation the connection made has a uniform predetermined shape, which is an advantage where, for example, the connection has to be incorporated under close tolerance conditions into electrical apparatus. Furthermore the connection is strong mechanically and is capable of withstanding considerable forces which may be exerted on it during use.

SUMMARY OF THE INVENTION

The present invention accordingly provides a method and apparatus for making a connection, such as an electrical connection, which comprises positioning at least one, preferably two or more, objects to be connected, e.g. electrically insulated wire(s), inside a hollow outer member and then squeezing the object(s), e.g. wire(s), against the inner surface of the outer member (so that in the case of wires, the insulation is displaced therefrom), the squeezing action being obtained either by deforming a mechanically deformable inner member so that it expands outwardly and forces the object(s), e.g. wire(s) against the outer member or else by forcing a suitably sized inner tool into the outer member.

In an embodiment, the inner and/or the outer members are electrically conductive. The outer member is preferably slightly resilient.

The wires may comprise separate insulated conductors or can be in the form of an insulated strip carrying two or more conductors. It will be appreciated that the conductors need not be circular in cross-section, the term "wires" being used in a board sense to cover any relatively small-sized electrical conductor element.

One simple way in which a connection can be made in accordance with the present invention is as follows. The wires are positioned around the inner surface of a small metal ring and then a suitably sized metal rivet is punched into the ring. The rivet is dimensioned so that it squeezes the wires against the ring and causes the insulation to be displaced without severing the wires leaving at least part of the conductor wires bare and thus establishing electrical connection between them. The rivet and/or the ring may be longitudinally tapered in order to give an improved wedge-like fit.

In a method of the present invention two or more electrically insulated wires are positioned between the outer surface of a mechanically deformable inner member and the inner surface of a relatively rigid outer member and then the inner member is deformed so that it expands outwardly in the direction of the outer member and in doing so forces the insulated wires against the outer member in such a manner that the insulated is stripped therefrom.

The dimensions of the inner and outer members are preferably chosen so that on deformation and expansion of the inner member, in the absence of the wires, no contact is made between the outer surface of the inner member and the inner surface of the outer member, i.e. a small space remains between said surfaces. This reduces the risk of severing the wires.

In an embodiment of the present invention the inner member is a blind rivet and the outer member is a small metal ring, e.g. of brass, preferably dimensioned, as described above, to fit the blind rivet so that on expansion of the latter a small space remains between them. The outer ring may, in some cases, advantageously be replaced by a small hollow cap so that it resembles a bullet connector.

The resulting connections may be insulated and/or encapsulated by methods known in the art. For this purpose, the connector elements may be provided with an insulating cover. Preferred insulating covers are heat-shrinkable sleeves and end caps having a meltable inner layer which flows and encapsulates the connection as the insulation shrinks around it so as to produce a moisture-proof seal.

BRIEF DESCRIPTION OF THE DRAWINGS

The invention both as to its organization and principle of operation, together with further objects and advantages thereof, may be better understood by reference to the following detailed description of embodiments of the invention when taken in conjunction with the accompanying drawings in which.

DESCRIPTION OF THE PREFERRED EMBODIMENT

Figure 1:
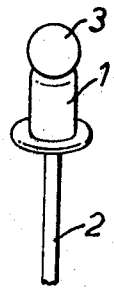
FIG. 1 is a perspective view of a blind rivet in accordance with this invention.

Referring now to FIG. 1, there is illustrated an inner member or blind rivet 1 made from a deformable metal, e.g. aluminum or an alloy thereof, together with its accompanying nail 2 having an enlarged head.

Figure 2:
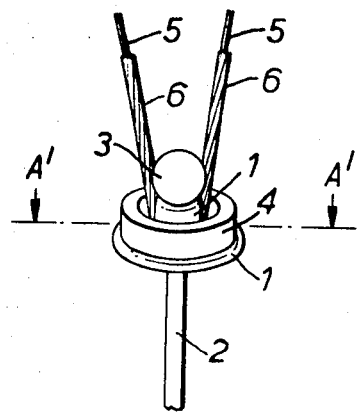
FIG. 2 is a perspective view of the blind rivet of FIG. 1 positioned inside an outer member and two insulated wires positioned between the inner and outer members prior to the deformation or expansion of the blind rivet in accordance with this invention.
Figure 3:
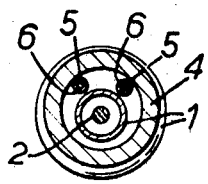
FIG. 3 is a sectional top view taken along the line A'—A' of FIG. 2, in accordance with this invention.

FIGS. 2 and 3 illustrate the position of the various components prior to making the connection. An outer member or small brass ring 4 surrounds the blind rivet 1 and the ends of two insulated wires 5 having insulation 6 are positioned between them.

Figure 4:
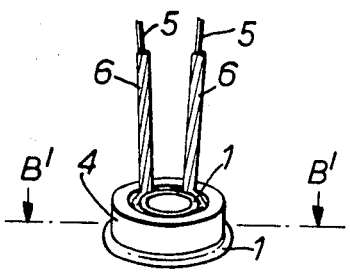
FIG. 4 is a perspective view of the assembly of FIG. 2 after the deformation or expansion of the blind rivet in accordance with this invention.

FIG. 4 illustrates the completed connection made by expanding the blind rivet 1 in a conventional manner by using a tool which pulls the nail 2 through the rivet so that the enlarged head 3 of the nail 2 expands the rivet 1 as it passes through it and presses or urges the rivet 1 outwardly in the direction of the brass ring 4.

Figure 5:
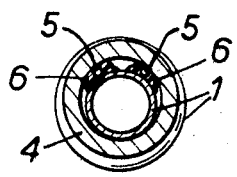
FIG. 5 is a sectional top view taken along the line B'—B' of FIG. 4 in accordance with this invention.

FIG. 5 illustrates that the pressure on the wire 5, as they were squeezed between the expanding rivet 1 and the brass ring 4 has stripped the insulation 6 from the wires 5 resulting in bared portions thereof (it is thought by shear forces) causing electrical contact to be made between them and the brass ring. Electrical contact may also be achieved only between the inner member or rivet 1 and the wires 5 by choosing an outer member with electrical insulating properties.

The stripped insulation 6 occupies other parts of the space between the expanded rivet 1 and the brass ring 4. By correct choice of the dimensions of the brass ring relative to those of the expanded rivet the stripping or disposing of the insulation is achieved yet severing of the wires is avoided. Only routine experiment is needed to determine the suitable dimensions in each case.

Many variations are, of course, possible within the basic framework of the present invention. For example, the blind rivets may be used without nails, a modified tool being used which is provided with a part which expands the rivet.

One or both of the surfaces which squeeze and strip the wires may be contoured so as to improve the stripping action.

Figure 6:
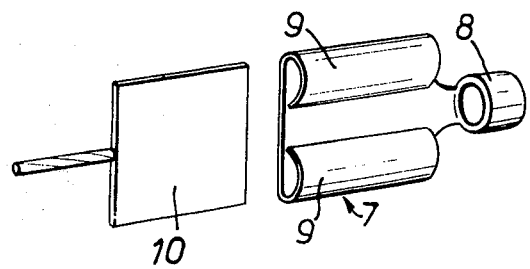
FIG. 6 is a perspective view of a connector component in accordance with this invention.

The inner and/or outer members, e.g. the blind rivet and the brass ring, may form part of a larger component. For example, in FIG. 6 of the drawings there is shown a connector member 7 including a brass ring 8 and having bent-over edges 9. The brass ring 8 forms the outer member of an electrical connection when used in conjunction with the blind rivet assembly illustrated in FIG. 2. The blind rivet is inserted into the hollow of the brass ring 8 and expanded accordingly in a manner previously described to achieve an electrical connection between the wires and the connector member 7. A complementary plate member 10 can be slid into the connector member 7 under the bent-over edges 9 to effect a further electrical connection.

Figure 7:
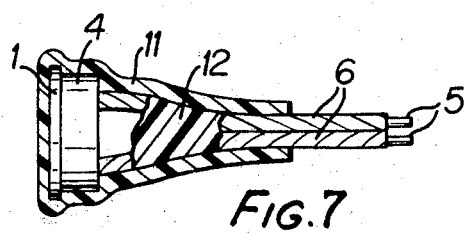

The resulting connections may be insulated and/or encapsulated by methods known in the art. FIG. 7 illustrates the use of a heat-shrinkable end cap 11 having a multiple inner liner 12 which flows and encapsulates the connection as the end cap shrinks around the connection to produce a moisture-proof seal.

Other modifications and variations will be readily apparent to those skilled in the art.

It can be seen that the present invention provides an inexpensive and simple method of making electrical connections with groups of wires, prior stripping of the wires being unnecessary. The number of wires is limited only by the size of the components of the connection. The present invention is accordingly especially suitable for applications in the telecommunication and automobile and aerospace industries where it affords the possibility of making simple, reliable multi-wire connections in very small spaces.

It will be appreciated that the expansion effect, i.e. the utilization of a expansion force operating outwardly against the inner surface of a relatively rigid outer member, the expansion force being generated for example by expanding a blind rivet or by punching in a wedge rivet is generally applicable to the formation of mechanical connections.

While embodiments and applications of this invention have been shown and described, it will be apparent to those skilled in the art that many more modifications are possible without departing from the inventive concepts herein described.

What is claimed as new and desired to be secured by Letters Patent of the United States is:

1. A method of making an electrical connection comprising the steps of:
   placing a blind rivet comprising a tubular deformable member into a relatively rigid ring;
   placing an insulated portion of an electrical conductor between the inner surface of the ring and the outer surface of the deformable member; and
   expanding the tubular deformable member by drawing a nail having an enlarged head therethrough forcing the outer wall of the tubular deformable member outwardly toward the inner surface of the ring displacing the insulation from the insulated portion of the conductor positioned therebetween thereby realizing an electrical connection between at least the conductor and the ring.

* * * * *